No. 733,121. PATENTED JULY 7, 1903.
J. O. BANE.
SPRING ATTACHMENT FOR PUMPS.
APPLICATION FILED APR. 21, 1903.
NO MODEL.
Fig. I.
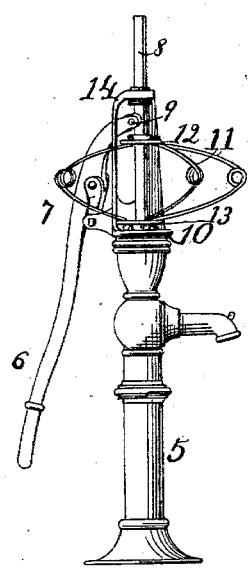
Fig. II.
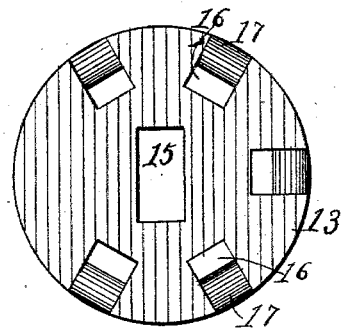
Fig. III.
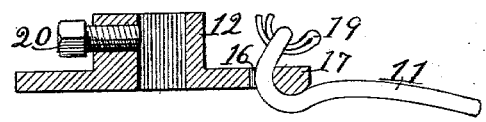
Fig. IV.
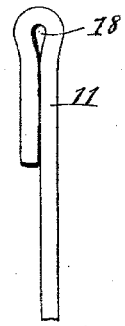
Witnesses
N. P. Waller
A. E. Waller
Inventor
James O. Bane,
by W. K. Stivens.
Attorney No. 733,121. Patented July 7, 1903.

UNITED STATES PATENT OFFICE.

JAMES O. BANE, OF WASECA, MINNESOTA.

SPRING ATTACHMENT FOR PUMPS.

SPECIFICATION forming part of Letters Patent No. 733,121, dated July 7, 1903.

Application filed April 21, 1903. Serial No. 153,671. (No model.)

*To all whom it may concern:*

Be it known that I, JAMES O. BANE, a citizen of the United States, residing at Waseca, in the county of Waseca and State of Minnesota, have invented a new and useful Improvement in Spring Attachments for Pumps; and I do hereby declare the following to be a full, clear, and exact description of the same.

This invention relates to spring attachments for pumps; and its object is to provide means for attaching the springs which are used to counterbalance the weight of the pump-rod so that they may be more durable and be made more economically.

To this end my invention consists in the construction and combination of parts forming spring attachments for pumps, hereinafter more fully described, and particularly pointed out in the claim, reference being had to the accompanying drawings, in which—

Figure I represents a pump showing my spring attachments in service. Fig. II is a plan view of one of the connecting-collars. Fig. III shows a vertical section of the upper collar. Fig. IV is a plan view of the end of a spring straightened out on a horizontal plane.

Numeral 5 represents the body of a pump, 6 the pump handle or lever, 7 the pitman by means of which the handle is hung to the pump-cap 10, and 8 the piston-rod, to which the handle may be connected in any usual manner, such as by a pivot 9.

11 represents U-shaped springs, and 12 13 represent collars for connecting the springs with the pump and piston-rod.

14 is a guiding-arm for the upper portion of the piston-rod to slide in. Each collar is provided with a central aperture 15 to admit the piston-rod. The upper collar 12 is fastened to the piston-rod by suitable means for permitting it to be adjusted vertically and fixed at any desired point on the rod, such as a binding-screw 20; but the lower collar 13 rests upon the top cap 10 of the pump and permits the piston-rod to slide freely through it. It has been found necessary to fasten the ends of the springs in some way to the collars to keep them from jumping out of place in service. In attempting to do this by means of ears cast upon the collars and small pins put through holes in the ears outside of the springs I have sometimes found the ears too hard in the castings to be readily drilled by a small drill, and at other times they are so soft that the ears are easily broken across the drilled holes in service. To obviate these objections, I cast the collars with holes 16 through them, leaving cross-bars 17 beside the holes, which cross-bars are segments of cylinders in form, and I shape the ends of the springs each with an eye 18 to receive a wire pin 19 after the end of the spring end of the spring is in place in a hole 16. Each spring is curved near its end somewhat in hook form to fit around the cylindrical surface of the cross-bar 17. At every movement of the piston in service one end of the spring is carried up and down therewith, so that both ends have a rolling motion around their respective cross-bars 17, and for this reason the cross-bars and springs are given a cylindrical bearing where they come in contact. By this means I am enabled to cast the collars completely done, excepting the screw-hole in the upper collar, and this comes in a thick portion of the casting, which is seldom hardened in cooling, so that the screw-hole may be easily drilled and tapped. It also provides a more lasting bearing for the spring. The pin-eyes 18 being formed by bending the springs there is no danger of their ever being broken. Thus a better and more economical attachment is produced.

Having thus fully described my invention, what I believe to be new, and desire to secure by Letters Patent, is the following:

In spring attachments for pumps, two collars having each an aperture to receive a pump piston-rod, one of the collars having means for securing it to the piston-rod; means for supporting the other collar upon the pump, and U-shaped springs to engage the said collars; each spring having an eye in each end, and each collar having holes near its edge for receiving springs, and cross-bars in the form of segments of cylinders beside the holes, and the springs being curved near their ends to fit the said cylindrical forms, and pins for the eyes in the springs, substantially as described.

In testimony whereof I affix my signature in presence of two witnesses.

JAMES O. BANE.

Witnesses:
JOHN MOONAN,
FRANK KIESLER.